United States Patent [19]

Daubach et al.

[11] 3,960,486

[45] June 1, 1976

[54] POWDERED, HIGHLY CONCENTRATED AND STABLY DISPERSIBLE DYE FORMULATIONS

[75] Inventors: Ewald Daubach, Ludwigshafen; Heinz Saukel, Friedelsheim; Leonhard Von Rambach, Ludwigshafen, all of Germany

[73] Assignee: BASF Aktiengesellschaft, Ludwigshafen (Rhine), Germany

[22] Filed: Sept. 16, 1974

[21] Appl. No.: 506,560

[30] Foreign Application Priority Data

Sept. 27, 1973 Germany............................ 2348518

[52] U.S. Cl............................................. 8/79; 8/85; 8/88; 8/89; 8/92; 8/93; 8/169; 8/172
[51] Int. Cl.².............................................. D06P 1/68
[58] Field of Search................. 8/79, 88, 85, 92, 93, 8/169, 172

[56] References Cited
UNITED STATES PATENTS

| | | | |
|---|---|---|---|
| 2,819,258 | 1/1958 | Schmid et al. .............................. | 8/79 |
| 3,057,674 | 10/1962 | Musser et al. .............................. | 8/89 |
| 3,167,517 | 1/1975 | Millson et al. .............................. | 8/93 |
| 3,203,753 | 8/1965 | Sherburne................................... | 8/93 |
| 3,291,556 | 12/1966 | Berger ........................................ | 8/93 |
| 3,377,130 | 4/1968 | Millson et al. .............................. | 8/85 |
| 3,741,719 | 6/1973 | Ramanathan et al...................... | 8/85 |

*Primary Examiner*—V. P. Hoke
*Attorney, Agent, or Firm*—Johnston, Keil, Thompson & Shurtleff

[57] ABSTRACT

Powdered, highly concentrated and stably dispersible dye formulations which are substantially devoid of dye agglomerates, which contain dyes which are not soluble in water such as disperse dyes or vat dyes, anionactive dispersing agents and (as stabilizing agent) from 2 to 30% by weight based on the dye of a polyethylene oxide having a molecular weight of from 200 to 1000 or a reaction product which has been obtained from a. $C_6$ to $C_{20}$ fatty alcohols;
b. alkylphenols of $C_4$ to $C_{12}$ in the alkyl;
c. $C_{14}$ to $C_{20}$ fatty amines;
d. castor oil or hydrogenated castor oil;
e. $C_{14}$ to $C_{20}$ fatty acids; or
f. natural resin acids with from 2 to 80 moles of ethylene oxide per mole of OH or $NH_2$ groups; or from alkylenediamines of two to five carbon atoms with from 25 to 120 moles of propylene oxide and ethylene oxide per mole of $NH_2$ groups. The formulations are stable in storage at 60°C and remain devoid of dye agglomerates.

8 Claims, No Drawings

POWDERED, HIGHLY CONCENTRATED AND STABLY DISPERSIBLE DYE FORMULATIONS

The invention relates to powdered, highly concentrated stably dispersible dye formulations which are practically devoid of dye agglomerates and are based on dyes which are insoluble in water.

In the production of powdered dye formulations anionactive dispersing agents are used as a rule such as lignin sulfonates or condensation products based on naphthalenesulfonic acid and formaldehyde, cresol/phenolformaldehyde and sodium sulfite and/or naphtholsulfonic acid. The water-insoluble dyes, also referred to hereinafter simply as dyes, are generally pulverized and dispersed in a ratio of from 2:3 to 1:1 parts by weight with one or a mixture of the above dispersing agents in a conventional manner in continuous or batch kneaders and/or in the form of an aqueous flowable suspension in grinding units until a mean particle size of from 0.1 to 0.5 microns has been achieved.

Examples of grinding units are corundum disc mills, ball mills, sand mills, Perl mills or stirred ball mills (attritors) which contain ceramic members, sand or iron balls as grinding media.

The aqueous dispersion obtained is then dried to a powder in spray dryers. Agglomeration of the dye particles very often takes place during drying, especially when the dye content of the dry formulation is around or above 40% by weight. These agglomerates have a size of several microns and are very stable. They cannot be dispersed again under normal conditions in the preparation of a batch for dyeing or printing. For this reason these formulations are useless because the agglomerates cause spots or specks on the substrate to be dyed or printed.

Powdered dye formulations which are to be used for dyeing or printing therefore have to have a very fine dispersion and should not contain any agglomerates.

Agglomeration of finely dispersed dyes in drying may be decreased or even entirely prevented for example by a. first kneading the dye with the dispersing agent in a batch or continuous kneader and then grinding it in a sand mill or other wet grinding unit;
b. considerably lowering the temperature of entrance into the spray dryer (gas inlet temperature 60° to 70°C, so that the throughput is considerably decreased); and/or
c. greatly decreasing the dye content in favor of the auxiliaries.

Because of the high expenditure for apparatus and low space-time yields the said measures are not economic for decreasing or preventing dye agglomeration. Moreover the powdered dye formulations thus obtained have the disadvantage that agglomeration of the dye takes place during storage. Depending on the dye this agglomeration may take place in only one week to two weeks at ambient temperature, while in other cases it does not occur for several weeks or months. A high storage temperature will accelerate the agglomeration.

It is the object of the present invention to provide a powdered dye formulation which is devoid or substantially devoid of dye agglomerates by drying from an aqueous dispersion and which does not tend to agglomerate even when stored at a temperature of more than 30°C.

We have found that powdered, highly concentrated and stably dispersible dye formulations which are substantially free from dye agglomerates are obtained from (A) one or more dyes which are not soluble in water and (B) one or more anionactive dispersing agents when the said formulation has (C) a content of from 2 to 30% by weight based on the dye of a stabilizing agent, which is an oxyalkylation product of:

$C_1$. a reaction product of:
 a. a saturated fatty alcohol and/or unsaturated fatty alcohol of six to twenty carbon atoms;
 b. an alkylphenol of four to twelve carbon atoms in the alkyl;
 c. a saturated fatty amine and/or unsaturated fatty amine of ten to twenty carbon atoms;
 d. castor oil and/or hydrogenated castor oil;
 e. a saturated fatty acid and/or unsaturated fatty acid of fourteen to twenty carbon atoms; or
 f. a natural resin acid
with from 2 to 80 moles of ethylene oxide per mole of hydroxyl or amino groups; or of $C_2$. a reaction product of
 g. an alkylene diamine of two to five carbon atoms with from 25 to 120, preferably 60 to 100, moles of propylene oxide and ethylene oxide per mole of amino groups, at least 20 moles of EO, preferably 30 to 50 moles of EO, being used per mole of amino groups, or $C_3$. a polyethylene oxide of a molecular weight of from 200 to 1000 or $C_4$. a mixture of two or more of such oxyalkylation products from ($C_1$), ($C_2$), and/or ($C_3$).

The oxyalkylation products serve as stabilizing agents which substantially or completely prevent agglomeration of the dispersed dye.

The dye formulations according to the invention are stable against agglomeration not only in spray drying the aqueous dispersions to dry formulations at gas entry temperature of up to 200°C but also in prolonged storage of the powedered formulation at temperatures of from ambient temperature to 60°C are stable against agglomeration of the dye.

The following stabilizing agents are suitable for the formulations according to the invention:

a. reaction products of saturated and/or unsaturated fatty alcohols of six to twenty carbon atoms with from 2 to 80 moles of ethylene oxide (hereinafter represented by EO) per mole of hydroxyl groups, preferably of fatty alcohols of fourteen to eighteen carbon atoms with from 6 to 25 moles of EO per mole of hydroxyl groups;

b. reaction products of alkylphenols of four to twelve carbon atoms in the alkyl radical with from 2 to 60 moles of EO per mole of phenolic hydroxyl groups and preferably of alkylphenols of eight or nine carbon atoms in the alkyl radical with from 4 to 25 moles of EO per mole of hydroxyl groups;

c. reaction products of saturated and/or unsaturated fatty amines of ten to twenty and preferably from sixteen to twenty carbon atoms with from 20 to 60 moles of EO per mole of amino groups;

d. reaction products of castor oil or hydrogenated castor oil with from 10 to 80 and preferably from 30 to 70 moles of EO per mole of hydroxyl groups;

e. reaction products of saturated and/or unsaturated fatty acids of fourteen to twenty carbon atoms with from 2 to 50 moles of EO and preferably from 5 to 15 moles of EO per mole of hydroxyl groups;

f. reaction products of natural resin acids, for example rosin or abietic acid with from 10 to 80 and preferably from 30 to 50 moles of EO per mole of hydroxyl groups in the carboxylic acid;

g. reaction products of alkylenediamines of two to five carbon atoms with from 25 to 120 and preferably from 60 to 100 moles of propylene oxide and EO per mole of amino groups, at least 20 moles of EO and preferably from 30 to 50 moles of EO being used per mole of amino groups; and $C_3$- polyethylene oxide of a molecular weight of from 200 to 1000 and preferably from 250 to 800.

Mixtures of these adducts may also be used; these may be obtained by mixing individual adducts or obtained direct by oxyalkylation of a mixture of the compounds on which the reaction products are based.

Examples of saturated and/or unsaturated fatty alcohols of six to twenty carbon atoms for (a) are: hexanol, 2-ethylhexanol, decanol, dodecanol and preferably palmityl alcohol, stearyl alcohol, oleyl alcohol, tall oil alcohols, linear fatty alcohols obtained from fatty alcohol synthesis according to Ziegler and being substantially of from twelve to twenty carbon atoms, mixtures of saturated and unsaturated alcohols of sixteen to eighteen carbon atoms, such as for example those available commercially under the registered trade mark HD-Ocenol 60/65.

Butylphenol, hexylphenol and particularly isooctylphenol, nonylphenol and dodecylphenol are suitable as alkylphenols for (b).

Examples of fatty amines in addition to stearylamine are palmitylamine and especially oleylamine.

Examples of saturated and/or unsaturated fatty acids for (e) are palmitic acid and especially stearic acid and oleic acid.

Particularly suitable alkylenediamines for (e) are ethylenediamine and propylenediamine-1,3; butylenediamine and pentylenediamine may also be used.

The following reaction products are given as being particularly preferred from the group of stabilizing agents:

tallow fatty alcohol with from 6 to 50 moles of EO per mole of hydroxyl groups; a mixture of saturated and unsaturated alcohols of sixteen to eighteen carbon atoms (HC-Ocenol 60/65 $^R$) with from 6 to 25 moles of EO per mole of hydroxyl groups; saturated alcohols of nine to eleven carbon atoms with from 3 to 12 moles of EO per mole of hydroxyl; isooctylphenyl and nonylphenol with from 4 to 50 moles of EO, oleylamine with 10 to 15 moles of EO; castor oil or hydrogenated castor oil with from 35 to 70 moles of EO, rosin with from 30 to 50 moles of EO; saturated fatty acid mixtures of fourteen to eighteen carbon atoms with from 5 to 15 moles of EO; ethylenediamine and propylenediamine first with from 30 to 70 moles of propylene oxide and then with from 30 to 50 moles of EO. Polyethylene oxide of a molecular weight of from 300 to 800 and mixtures which contain from 95 to 50% by weight of the oxyethylation products of fatty alcohols of sixteen to eighteen carbon atoms with from 20 to 80 moles of EO and from 5 to 50% by weight of polyethylene oxide of a molecular weight of from 300 to 800 are also preferred.

The following reaction products are specially preferred from among the said oxyalkylation products because of their particularly high stabilizing effect:

tallow fatty alcohol with from 20 to 25 moles of EO; a mixture of saturated and unsaturated fatty alcohols of from 16 to 18 carbon atoms with from 20 to 25 moles of EO; isooctylphenol and nonylphenol with from 6 to 25 moles of EO; castor oil with from 45 to 50 moles of EO; ethylenediamine first with from 30 to 50 moles of propylene oxide and then with from 30 to 50 moles of EO; and moreover polyethylene oxide of a mean molecular weight of from 300 to 800. The EO and propylene oxide adducts are known and may be prepared by conventional methods.

The amount of stabilizer in the formulations according to the invention is as a rule from 2 to 30 and preferably from 2.5 to 25% by weight based on the dye. The amount depends particularly on the dye, depending on whether it has a greater or lesser tendency to agglomerate. In most cases an addition of from 2.5 to 15% by weight of stabilizer based on dye is sufficient to stabilize the formulation against agglomeration both in the drying and also during storage. It is only in the case of dyes which tend to agglomerate very readily that additions of from 10 to 30% by weight, based on the dye, are necessary for stabilization. The addition of more than 30% by weight of stabilizer does not produce any improvement in the formulation and does not give any further stabilization of the finely divided dye in the powdered formulation.

Dyes for the formulations according to the invention include all dyes used for textile purposes which are insoluble or substantially insoluble in water, vat dyes based on anthraquinone and more highly condensed polycyclic systems, sulfur dyes, disperse dyes based on azobenzene compounds and anthraquinoid disperse dyes.

The production of the powdered, highly concentrated and stably dispersible dye formulations is carried out by conventional methods by continuous or batchwise kneading and/or grinding of an aqueous suspension of the dye in a ball mill or other wet grinding equipment, preferably in a sand mill.

The stabilizing agent may be added before, during or after the dispersion of the dye. It is preferable however to add the stabilizing agent prior to the dispersion of the dye.

The powdered, highly concentrated stably dispersable formulations according to the invention fulfil all the requirements of formulations which are to be used for drying and printing processes. In contrast dye formulations which have been prepared under otherwise identical conditions but without a stabilizer are so seriously agglomerated after drying that they are unsuitable as dyes for printing or dyeing.

In spite of the addition of oxyalkylation products no disturbance by foam formation occurs when dyeing and/or printing with the formulations according to the invention. Nor has any decrease in the yield been observed as a consequence of the addition of the stabilizer.

The following Examples will further illustrate the invention. Parts and percentages hereinafter given are by weight.

EXAMPLE 1

50 parts of violanthrene

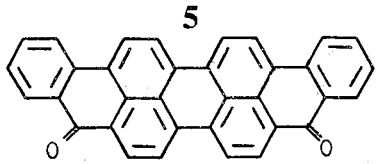

40 parts of a lignin sulfonate and
10 parts of a reaction product of $C_{16}$ to $C_{18}$ fatty alcohol with 25 moles of EO are made into a paste with 400 parts of water and dispersed in a sand mill until a particle size of about 0.5 micron has been achieved.

The dispersion is then dried in a spray drying tower with a gas entry temperature of 150°C. The dye powder obtained has a satisfactory fine dispersion.

No decline in the fine dispersion can be established after this formulation has been kept for three days at 60°C.

If the dye is dispersed in a formulation under otherwise the same conditions but without the ethylene oxide adduct and dried, the dye undergoes marked agglomeration during the drying. This agglomeration is intensified by storage for one or two weeks at room temperature or for three days at 60°C.

EXAMPLE 2

(a)
50 parts of violanthrene,
40 parts of a lignin sulfonate and
5 parts of a reaction product of isooctylphenol with 25 moles of EO is made into a paste with 400 parts of water as described in Example 1, ground and dried in a spray drying tower with a gas entry temperature of 120°C.

The formulation has a satisfactory fine dispersion and meets all requirements placed on vat dyes for dyeing and printing.

(b)
Comparative experiment: the dye is dispersed under the same conditions as under (a) but in the absence of the ethylene oxide adduct. The dye agglomerates to such a marked extent during drying that the formulation is no longer suitable for use in machine dyeing or for printing.

A formulation just as good as that under (a) is obtained when the reaction product of nonylphenol or of dodecylphenol with 25 moles of EO is used instead of that of isooctylphenol.

EXAMPLE 3

50 parts of violanthrene,
40 parts of a lignin sulfonate are made into a paste with 400 parts of water, dispersed in a sand mill to a mean particle size of 0.5 micron and then
7.5 parts of a reaction product of a partially unsaturated fatty alcohol of 16 to 18 carbon atoms with 20 moles of EO is stirred into the dispersion and the whole then dried in a spray drying tower with a gas entry temperature of 130°C. The dye powder obtained has satisfactory fine dispersion which is retained intact over a storge period of three days at 60°C.

EXAMPLE 4

The procedure described in Example 1(a) is repeated but using 7.5 parts of a reaction product of castor oil with 48 moles of EO. A dye powder is obtained having a very fine dispersion of the dye which remains intact even after storage for three days at 60°C.

EXAMPLE 5

(a)
50 parts of the dye obtained by condensation of 1 mole of tetrabromopyranthrone with aminoviolanthrone and 1-aminoanthraquinone,
45 parts of a lignin sulfonate and
5 parts of an adduct of nonylphenol and 25 moles of EO are made into a paste with
400 parts of water and ground in a Perl mill with a sand filling until a particle size of 0.5 micron has been obtained. It is then dried in a spray drying tower at a gas entry temperature of 120°C.

The formulation has a satisfactory fine dispersion and meets the requirements of a vat dye for dyeing and printing.

(b)
Comparative experiment: when the dye is dispersed under the same conditions as under (a) but in the absence of the EO adduct, the dye in the formulation becomes so heavily agglomerated during drying that the formulation is not suitable for use in machine dyeing.

The same result as in (a) is obtained when the adduct of isooctylphenol to 25 moles of EO is used instead of the nonylphenol adduct.

EXAMPLE 6

The procedure of Example 5(a) is repeated but using 5 parts of an adduct of $C_{16}$ to $C_{18}$ fatty alcohol to 25 moles of EO. A formulation with a satisfactory fine dispersion is again obtained.

EXAMPLE 7

The procedure described in Example 5(a) is repeated but using 7.5 parts of the adduct of $C_{16}$ to $C_{18}$ fatty alcohol to 20 moles of EO. A formulation having satisfactory fine dispersion is obtained which does not change even when kept at 60°C.

EXAMPLE 8

The procedure described in Example 5(a) is repeated but 10 parts of a reaction product of castor oil with 48 moles of EO is used as the stabilizer. A dye powder is obtained which contains the dye in a satisfactory fine dispersion. The fine dispersion is retained when the powder is kept for three days at 60°C.

EXAMPLE 9

The procedure described in Example 5(a) is repeated but 7.5 parts of the reaction product of an unsaturated fatty alcohol of sixteen to eighteen carbon atoms and 22 moles of EO is used as the stabilizer. A powdered formulation is obtained which has satisfactory fine disperison of the dye and which is outstandingly suitable for dyeing and printing. The fine dispersion is retained intact after keeping for three days at 60°C.

EXAMPLE 10

50 parts of the dye specified in Example 5(a),
40 parts of a lignin sulfonate and
10 parts of polyethylene oxide of a mean molecular weight of 400 are dispersed and dried to powder as described in Example 1(a).

The formulation has a satisfactory fine dispersion and is outstandingly suitable for machine dyeing and printing.

If the dispersion is carried out in the absence of polyethylene oxide the formulation obtained after drying contains the dye already agglomerated and is therefore not suitable either for printing or for machine dyeing.

EXAMPLE 11

70 parts of the dye

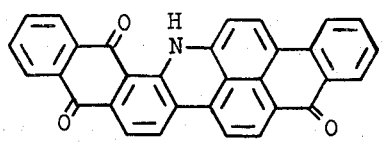

22.5 parts of a lignin sulfonate and
7.5 parts of the reaction product of castor oil with 48 moles of EO are made into a paste with water as described in Example 1(a), ground and dried in a spray drying tower with a gas entry temperature of 120°C.

The dye powder obtained is not agglomerated and retains its fine dispersion even after having been kept for five days at 60°C.

When the formulation is prepared under otherwise the same conditions but in the absence of the ethylene oxide adduct the dye agglomerates during drying. A fairly stable and only slightly agglomerated formulation can be obtained by decreasing the content of dye to 40 percent or less based on the formulation. Agglomeration of the dye takes place however when it is kept for five days at 60°C.

EXAMPLE 12

70 parts of the dye specified in Example 11,
22.5 parts of a lignin sulfonate and
7.5 parts of the reaction product of an unsaturated fatty alcohol of sixteen to eighteen carbon atoms and 22 moles of EO are stirred together and dispersed as described in Example 1(a). A finely dispersed powdered formulation which is stable in storage is obtained.

In contrast to this a formulation which has been prepared without adding the ethylene oxide adduct is only stable in storage when the content of dye is less than 40 percent based on the formulation.

EXAMPLE 13

60 parts of the dye specified in Example 1(a),
10 parts of a polyethylene oxide of a mean molecular weight of 400 and
30 parts of a lignin sulfonate are dispersed and dried to a powder as described in Example 1(a).

A highly dispersed dye formulation is obtained which is stable in dispersion and which remains stable after storage for long periods at a temperature of about 60°C.

When the polyethylene oxide is replaced by an equal amount of lignin sulfonate and the procedure of Example 1(a) is otherwise repeated a dye formulation is obtained in which the dye agglomerates during drying and which is not stable in storage.

EXAMPLE 14

60 parts of the dye specified in Example 11,
35 parts of a lignin sulfonate and
5 parts of a reaction product of a fatty alcohol of sixteen to eighteen carbon atoms and 25 moles of EO is dispersed as described in Example 3 and dried in a spray drying tower at a gas entry temperature of 120°C. A formulation is obtained which is stable in dispersion and in storage.

EXAMPLE 15

60 parts of the dye specified in Example 11,
32.5 parts of a condensation product of formaldehyde and naphthalenesulfonic acid and
7.5 parts of the reaction product of isooctylphenol with 20 moles of EO are dispersed and dried in a spray drying tower at a gas entry temperature of 125°C as described in Example 1(a). A highly dispersed powdered formulation is obtained which is stable in storage.

The same result is obtained with the adduct of nonylphenol and 20 moles of EO.

EXAMPLE 16

65 parts of the dye

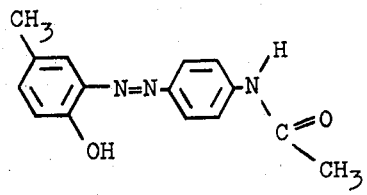

20 parts of a condensation product from phenol, sodium sulfite and formaldehyde,
10 parts of a lignin sulfonate and
5 parts of the adduct of isooctylphenol and 6 moles of EO are made into a paste with 600 parts of water and dispersed in a sand mill until a particle size of mainly about 0.5 micron has been achieved.

The dispersion is then dried in a spray drying tower at a gas entry temperature of 130°C.

A dye powder is obtained having unchanged fine dispersion and exhibiting satisfactory properties in use.

No decline in the fine dispersion can be detected after the dye powder has been stored for three days at 60°C.

On the other hand a formulation prepared under otherwise the same conditions but in the absence of the ethylene oxide adduct exhibits clear dye agglomeration after having been kept for three days.

EXAMPLE 17

65 parts of the dye specified in Example 16,
20 parts of a condensation product from phenol, sodium sulfite and formaldehyde,
10 parts of a lignin sulfonate and
5 parts of the adduct of $C_{16}$ to $C_{18}$ fatty alcohol and 25 moles of EO is made into a paste with 600 parts of water and dispersed in a sand mill until a particle size of mainly about 0.5 micron is achieved.

The dispersion is then dried in a spray drying tower at a gas entry temperature of 130°C.

A dye powder is obtained with unchanged fine dispersion and with satisfactory properties in use.

When this dye powder is stored for three days at 60°C no decline in the fine dispersion can be detected.

In contrast a formulation which has been dispersed and dried under the same conditions in the absence of the adduct exhibits marked dye agglomeration.

EXAMPLE 18

70 parts of the dye specified in Example 16,
20 parts of a condensation product from phenol, sodium sulfite and formaldehyde and
10 parts of a lignin sulfonate are made into a paste with
500 parts of water and dispersed in a sand mill until a particle size of mainly about 0.5 micron has been achieved.

Then 5 parts of an adduct of isooctylphenol and 6 moles of EO is stirred into the dispersion. After drying in a spray drying tower at a gas entry temperature of 130°C a dye powder with unchanged fine dispersion is obtained with satisfactory properties in use.

No decline in the fine dispersion can be detected after the said dye powder has been stored for three days at 60°C.

A formulation prepared without adding the ethylene oxide adduct exhibits marked dye agglomeration after drying.

The same result is obtained when using the adduct of 6 moles of ethylene oxide to nonylphenol.

EXAMPLE 19

The procedure described in Example 18 is repeated but using 5 parts of an adduct of 25 moles of EO to $C_{16}$ to $C_{18}$ fatty alcohol. A powder is obtained having unchanged fine dispersion and satisfactory properties in use and which is stable in storage.

EXAMPLE 20

The procedure described in Example 19 is repeated but 5 parts of an adduct of 20 moles of EO to partly unsaturated fatty alcohol of sixteen to eighteen carbon atoms is used. A powder is obtained having outstanding fine dispersion and stability in storage.

EXAMPLE 21

The procedure described in Example 18 is repeated but 5 parts of the reaction product of isooctylphenol and 20 moles of EO is used. A powdered formulation is obtained which has satisfactory properties in use. The formulation is also unchanged after being kept for three days at 60°C.

EXAMPLE 22

The procedure described in Example 18 is repeated but 5 parts of a reaction product of castor oil with 48 moles of EO is used. A dye powder is obtained having unchanged fine dispersion, satisfactory properties in use and good stability in storage.

EXAMPLE 23

The procedure described in Example 18 is repeated but using 5 parts of an adduct of 25 moles of EO to nonylphenol. A powdered formulation is obtained which has satisfactory properties in use and which is stable in storage.

EXAMPLE 24

65 parts of the dye

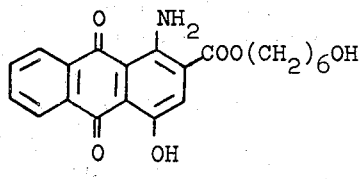

and
35 parts of a lignin sulfonate are made into a paste with 200 parts of water and dispersed in a sand mill until a particle size of mainly about 0.5 micron has been achieved. Then 10 parts of an adduct of 20 moles of EO to a $C_{16}$ to $C_{18}$ fatty alcohol is stirred in. After drying in a spray drying tower at a gas entry temperature of 120°C a dye powder is obtained with unchanged fine dispersion and with satisfactory properties in use.

A formulation not having the ethylene oxide adduct added to it exhibits marked dye agglomeration after the drying.

EXAMPLE 25

The procedure as described in Example 24 is repeated but 10 parts of the reaction product of a $C_{16}$ to $C_{18}$ fatty alcohol with 25 moles of EO is used. A powdered formulation is obtained which has satisfactory behavior in use and which is unchanged after having been stored at 60°C for three days.

EXAMPLE 26

The procedure described in Example 24 is repeated but 10 parts of the adduct of isooctylphenol and 20 moles of EO is used. A powdered formulation is obtained which has unchanged fine dispersion of the dye and satisfactory properties in use together with good stability in storage.

EXAMPLE 27

The procedure described in Example 24 is repeated but using 5 parts of an adduct of 20 mols of EO to a partly unsaturated $C_{16}$ to $C_{18}$ fatty alcohol. A powdered formulation is obtained which has satisfactory properties in use which have not changed after storage for three days at 60°C.

EXAMPLE 28

The procedure described in Example 24 is repeated using as stabilizer 5 parts of a reaction product of castor oil with 48 moles of EO. A dye powder is obtained which has satisfactory properties in use and at the same time good stability in storage.

EXAMPLE 29

60 parts of the dye specified in Example 24,
30 parts of a lignin sulfonate and
10 parts of a reaction product of a $C_{16}$ to $C_{18}$ fatty alcohol with
20 moles of EO is made into a paste with 200 parts of water and dispersed in a sand mill until a particle size of about 0.5 micron has been achieved. After having been dried in a spray dring tower at a gas entry temperature of 100°C a dye powder is obtained which has unchanged fine dispersion, satisfactory properties in use and retention of these features after storage for three days at 60°C.

A formulation to which no adduct of ethylene oxide has been added exhibits marked dye agglomeration after drying.

EXAMPLE 30

The procedure described in Examples 29 is repeated but using 10 parts of a reaction product of a $C_{16}$ to $C_{18}$ fatty alcohol with 25 moles of EO. A dye powder is obtained with unchanged fine dispersion and satisfactory properties in use all of which are retained intact after storage for three days at 60°C.

EXAMPLE 31

The procedure described in Example 30 is repeated but using 10 parts of a reaction product of isooctylphenol with 20 moles of EO. A dye powder is obtained having satisfactory properties in use and outstanding stability in storage.

EXAMPLE 32

65 parts of the dye

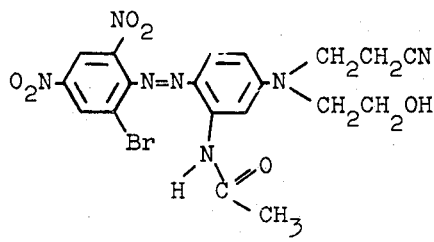

and
35 parts of a lignin sulfonate are made into a paste with 300 parts of water and dispersed in a sand mill until a particle size of mainly about 0.5 micron has been achieved. Then 10 parts of a reaction product of nonylphenol and 6 moles of EO is stirred into the dispersion. The whole is then dried in a spray drying tower at a gas entry temperature of 120°C.

A dye powder is obtained with unchanged fine dispersion and with satisfactory properties in use, all of which are unchanged by storage for three days at 60°C.

The same result is obtained when the reaction product of ethylene oxide with isooctylphenol is used.

A formulation which has been prepared without adding the ethylene oxide adduct exhibits marked dye agglomeration after drying.

When the ethylene oxide adduct is replaced by an equal amount of lignin sulfonate the formulation again agglomerates during drying.

EXAMPLE 33

The procedure described in Example 32 is repeated but using 10 parts of the reaction product of isooctylphenol and 20 moles of EO. A dye powder is obtained which has satisfactory properties in use and the same stability in storage.

EXAMPLE 34

The procedure described in Example 32 is repeated but using 10 parts of the reaction product of a $C_{16}$ to $C_{18}$ fatty alcohol with 25 moles of EO. A formulation is obtained which has the same properties as that obtained in Example 32.

EXAMPLE 35

The procedure described in Example 32 is followed but 10 parts of a reaction product of ethylenediamine with propylene oxide and then with EO in a molar ratio of 1:70:80 is added. A dye powder is obtained having unchanged fine dispersion and satisfactory properties in use, all of which remain unchanged after storage for three days at 60°C.

EXAMPLE 36

The procedure described in Example 32 is repeated but prior to drying 10 parts of a reaction product of ethylenediamine with propylene oxide and then with EO in the molar ratio 1:86:75 is added to the dispersion. A dye powder is obtained with the same properties as that obtained according to Example 32.

EXAMPLE 37

The procedure described in Example 32 is repeated but 10 parts of a reaction product of ethylenediamine with propylene oxide and then with EO in the molar ratio 1:100:100 is added to the dispersion. A dye powder is obtained with unchanged fine dispersion and satisfactory properties in use together with good stability in storage.

EXAMPLE 38

A suspension containing 25% of the dye of the formula:

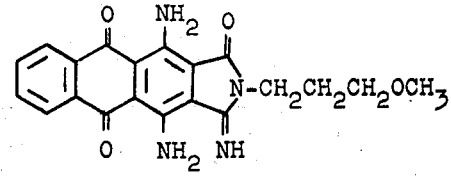

and 12.5% of sodium lignin sulfonate is ground in a sand mill until adequate values are obtained in the filter test (A. Schlottmann, Textil Praxis, 1957), page 63) and the centrifuge test (Richter und Vescia, Melliand 6 (1956), page 622).

To each of a number of samples of the suspension obtained there is added:

A. 2% of sodium lignin sulfonate,
B. 2% of a reaction product of tallow fatty alcohol with 25 moles of EO, and
C. 2% of a reaction product of ethylenediamine with propylene oxide and EO in the molar ratio 1:70:80.

The suspensions (A), (B) and (C) have after the additions the same degree of dispersion as the original suspension after grinding. The suspension (A), (B) and (C) are dried in a spray dryer at an entry temperature of the carrier gas of 200°C and an outlet temperature of about 80° to 100°C. From the suspension (A) there is obtained a powdered formulation in which the degree of dispersion has markedly fallen off whereas the powder from (B) and (C) has practically the same degree of dispersion as the aqueous suspension prior to drying. This result to be concluded from the behavior in use is confirmed by the centrifuge test.

| Formulation | Centrifuge test suspension | Powder |
|---|---|---|
| (A) | 5, 10, 25, 60 | 55, 20, 15, 10 |
| (B) | do. | 10, 15, 25, 50 |
| (C) | do. | 5, 15, 25, 55 |

Because of their fine dispersion the powder formulations (B) and (C) can be used for all dyeing and printing purposes, whereas the powder formulation (C) gives useless dyeings and prints because of the inferior degree of dispersion.

The centrifuge test is carried out as follows:

0.5 g of the dry material is introduced into 100 ml of fully desalted water at 40°C and homogenized by agitation. The dispersion obtained is centrifuged at 1000, 2000 and 4000 rpm on a centrifuge of the type Junior III as supplied by Messrs. Christ. The dye sediment in the individual stages is separated and the amount thereof is determined photometrically. At the end the amount of dye remaining unsedimented after the third centrifuging is determined. The total amount of dye is equated with 100. From this the percentages of the dye sedimented in the three stages and left unsedimented are calculated.

The centrifugal values are presented so that the first value of the percentage of sediment is at the lowest rpm of the centrifuge and the third value at the highest rpm while the fourth value is the percentage of unsedimented dye.

The percentages provide a measure of the fine dispersion of the dry material. The smaller the first and second values are, the smaller is the proportion of larger particles in the dispersion and consequently in the dried formulation.

We claim:

1. A powdered, highly concentrated and stably dispersible dye formulation which is practically devoid of dye agglomerate and which consists essentially of:

A. at least one water-insoluble dye;
B. at least one anion-active dispersing agent in an amount sufficient to disperse said dye in water; and
C. as a stabilizing agent from 2 to 30% by weight, with reference to said dye, of an oxyalkylation product which is
(C.1) a reaction product of
    a. a saturated fatty alcohol or unsaturated fatty alcohol, each of 6 to 20 carbon atoms, or a mixture thereof;
    b. an alkylphenol of 4 to 12 carbon atoms in the alkyl;
    c. a saturated fatty amine or unsaturated fatty amine, each of 14 to 20 carbon atoms, or a mixture thereof;
    d. castor oil or hydrogenated castor oil;
    e. a saturated fatty acid or unsaturated fatty acid, each of 14 to 20 carbon atoms, or a mixture thereof; or
    f. a natural resin acid, with from 2 to 80 moles of ethylene oxide per mole of hydroxyl or amino groups reactive with ethylene oxide;
(C.2) a reaction product of
    g. an alkylenediamine of 2 to 5 carbon atoms with from 25 to 120 moles of propylene oxide and ethylene oxide per mole of amino groups, at least 20 moles of ethylene oxide being used per mole of amino groups;
(C.3) a polyethylene oxide of a molecular weight of from 200 to 1,000; or
(C.4) a mixture of two or more of the oxyalkylation products designated above as (C.1), (C.2) and (C.3).

2. A dye formulation as claimed in claim 1 which contains a reaction product of a saturated fatty alcohol or unsaturated fatty alcohol or mixture thereof with 6 to 25 moles of ethylene oxide per mole of hydroxyl groups as (C).

3. A dye formulation as claimed in claim 1 which contains a reaction product of isooctylphenol, nonylphenol, dodecylphenol or a mixture of the same with from 40 to 25 moles of ethylene oxide per mole of hydroxyl groups as (C).

4. A dye formulation as claimed in claim 1 which contains a reaction product of castor oil or hydrogenated castor oil with from 30 to 70 moles of ethylene oxide per mole of hydroxyl groups as (C).

5. A dye formulation as claimed in claim 1 which contains a reaction product of ethylenediamine with from 30 to 70 moles of propylene oxide and then with from 30 to 50 moles of ethylene oxide per mole of amino groups.

6. The dye formulation claimed in claim 1 which contains from 2.5 to 25% by weight, with reference to said dye, of the stabilizing agent (C).

7. The dye formulation claimed in claim 1 which contains as the stabilizing agent (C) a reaction product of an alkylenediamine of 2 to 5 carbon atoms with from 30 to 50 moles of ethylene oxide and from 30 to 70 moles of propylene oxide.

8. The dye formulation claimed in claim 1 wherein the ratio by weight of (A):(B) is about 1:0.9 to 1:0.32.

* * * * *